United States Patent
Knauerhase et al.

(10) Patent No.: US 6,345,303 B1
(45) Date of Patent: Feb. 5, 2002

(54) NETWORK PROXY CAPABLE OF DYNAMICALLY SELECTING A DESTINATION DEVICE FOR SERVICING A CLIENT REQUEST

(75) Inventors: Robert Conrad Knauerhase, Portland; Michael Man-Hak Tso, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/943,215

(22) Filed: Oct. 6, 1997

Related U.S. Application Data

(60) Provisional application No. 60/042,072, filed on Mar. 25, 1997.

(51) Int. Cl.[7] .............................................. G06F 15/173
(52) U.S. Cl. ...................... 709/238; 709/202; 709/217; 709/219; 709/229; 709/245; 707/10; 707/104
(58) Field of Search ................................ 709/200–203, 709/206, 217–219, 225, 228–229, 235–239, 242, 245; 713/200–201; 707/10, 100–104

(56) References Cited

U.S. PATENT DOCUMENTS

| | | | | |
|---|---|---|---|---|
| 5,373,375 A | | 12/1994 | Weldy .......................... 358/523 |
| 5,406,557 A | * | 4/1995 | Baudoin ....................... 709/206 |
| 5,517,612 A | | 5/1996 | Dwin et al. .................. 395/166 |
| 5,544,320 A | | 8/1996 | Konrad .................... 395/200.09 |
| 5,603,029 A | * | 2/1997 | Aman et al. ................. 709/201 |
| 5,659,684 A | * | 8/1997 | Giovannoni et al. ......... 709/250 |
| 5,673,322 A | | 9/1997 | Pepe et al. ..................... 380/49 |
| 5,684,969 A | | 11/1997 | Ishida ........................ 395/342 |
| 5,701,451 A | | 12/1997 | Rogers et al. ............... 395/600 |
| 5,706,434 A | | 1/1998 | Kremen et al. ......... 395/200.09 |
| 5,724,556 A | | 3/1998 | Souder et al. ............... 395/500 |
| 5,727,159 A | | 3/1998 | Kikinis .................... 395/200.76 |
| 5,742,905 A | | 4/1998 | Pepe et al. ................... 455/461 |
| 5,768,510 A | | 6/1998 | Gish ...................... 395/200.33 |
| 5,774,660 A | * | 6/1998 | Brendel et al. ............. 709/201 |
| 5,805,735 A | | 9/1998 | Chen et al. .................. 382/239 |
| 5,826,014 A | * | 10/1998 | Coley et al. ................. 713/201 |
| 5,862,348 A | * | 1/1999 | Pedersen ..................... 709/229 |
| 5,878,231 A | * | 3/1999 | Baehr et al. ................. 709/245 |
| 5,903,889 A | * | 5/1999 | De La Huerga et al. ........ 707/3 |
| 5,918,013 A | * | 6/1999 | Mighdoll et al. ............ 709/217 |
| 5,961,601 A | * | 10/1999 | Iyengar ....................... 709/229 |
| 5,974,443 A | * | 10/1999 | Jeske ......................... 709/202 |
| 6,006,258 A | * | 12/1999 | Kalajan ...................... 709/219 |
| 6,058,422 A | * | 5/2000 | Ayanoglu et al. ........... 709/226 |

\* cited by examiner

*Primary Examiner*—Zarni Maung
*Assistant Examiner*—Bharat Barot
(74) *Attorney, Agent, or Firm*—Kenyon & Kenyon

(57) ABSTRACT

A dynamically-chainable network proxy is implemented in a method for chaining a network proxy to a destination device, wherein the network proxy is coupled to a source device and a plurality of destination devices, including the step of receiving a request from the source device at the network proxy. The network proxy then selects one of the plurality of destination devices to serve the request, with the selection made according to a predetermined selection criterion. The network proxy reformats the request to designate the selected destination device, and then forwards the reformatted request to the selected destination device.

13 Claims, 5 Drawing Sheets

NETWORK PROXY CAPABLE OF DYNAMICALLY SELECTING A DESTINATION DEVICE FOR SERVICING A CLIENT REQUEST

This application claims the benefit of U.S. Provisional Application No. 60/042,072, filed Mar. 25, 1997.

BACKGROUND OF THE INVENTION

The present invention relates generally to the field of computer networking, and in particular to a method and apparatus for enabling a device configured as a network proxy to be dynamically chained to a second network proxy.

It is known to deploy a network proxy, or proxy server, as an intermediary between one or more client computers and an external network such as the Internet. Network proxies are described generally in Ian S. Graham, *HTML Source Book: A Complete Guide to HTML* 3.0 403 (2d ed. 1996). Most existing network proxies lack the ability to chain to other proxies. Instead, such network proxies simply connect directly to a network server capable of servicing a request received from a client device. In other words, the typical transaction is client→network proxy→server. Some network proxies are capable of being statically configured to chain to another network proxy (for example, using static configuration ".INI" files or MS-Windows registry entries at compile time). An example of such a statically-chainable network proxy is the "networkmci Webmaker™" product distributed by MCI.

A potential disadvantage of existing network proxies, even those capable of being statically configured to chain to another network proxy, is limited flexibility with respect to system configuration arising from the lack of an ability to dynamically chain to other network proxies in response to, for example, changing network conditions. Even with existing statically-chainable network proxies, it is necessary to restart (or reboot) the network proxy device in order to change the designated "chained to" proxy. There is thus a need for a network proxy capable of being dynamically chained to another network proxy, thereby enabling system administrators to quickly and conveniently effect changes in network configuration.

SUMMARY OF THE INVENTION

The present invention relates to methods and devices for dynamically chaining a network proxy to a selected destination device. Embodiments of the invention may be used, for example, to chain a network proxy to a selected network server, or even another network proxy, in response to any of a wide variety of predetermined selection criteria.

According to one embodiment, a method for dynamically chaining a network proxy to a destination device, wherein the network proxy is coupled to a source device and a plurality of destination devices, begins with the network proxy receiving a request from the source device. The network proxy then selects one of the plurality of destination devices to serve the request, with this selection being made according to a predetermined selection criterion. The network proxy then reformats the request to designate the selected destination device as the recipient of the request, and forwards the reformatted request to the selected destination device.

DETAILED DESCRIPTION

A network proxy, or proxy server, is typically used in conjunction with so-called "firewall" software to protect a LAN (Local Area Network) from unauthorized access over the Internet. A firewall, typically installed on a gateway computer that links a LAN to the external world, restricts externally-originated network packets from entering the local network, thereby protecting the LAN from hazards such as unauthorized access. The firewall, however, also prevents network users from directly accessing external resources such as the World-Wide Web ("the Web"). Network proxies are often used to address this shortcoming. See Graham, at 403.

Network proxies are usually configured to have free access to both internal LAN resources and external resources, and can safely pass data back and forth across the firewall. Users may then be given safe, though indirect, access to Web resources by configuring the user's Web browser to reference the network proxy instead of external target servers. When the Web browser is used to retrieve information from outside the firewall it sends a request to the network proxy, which then completes the request and returns the result to the requester. Id.

Figure 1:
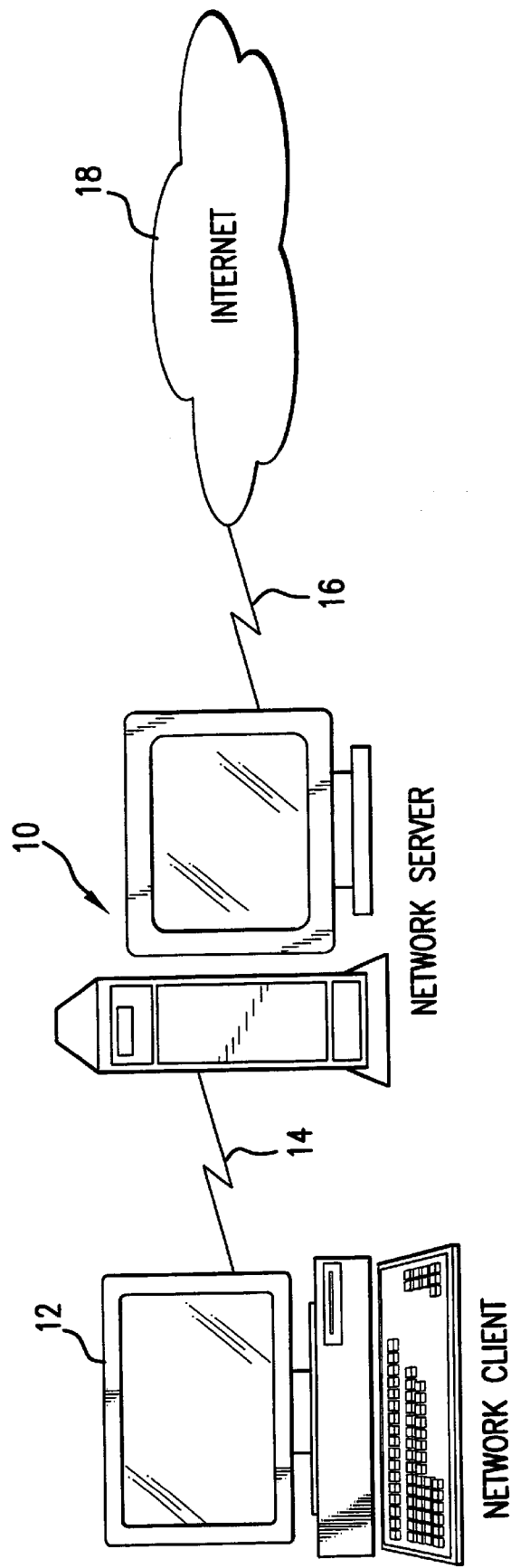
FIG. 1 is a schematic diagram illustrating an environment in which embodiments of the present invention may be implemented.

Referring now to FIG. 1, which illustrates an environment in which embodiments of the present invention may be implemented, a network server 10 manages the transfer of data from the Internet 18 to a network client 12. Network client 12 may be any computer having suitable data communications capability.

Network client 12 communicates requests for information to, and receives information from, network server 10 over a client/server communications link 14. Client/server communications link 14 may comprise, for example, a so-called "slow network" using, for example, POTS (Plain Old Telephone Service) dial-up technology or wireless connections. Alternatively, client/server communications link 14 may comprise a so-called "fast network," such as a LAN or WAN (Wide Area Network), which is capable of operating at much higher speeds (for example, 5x to 10x) than are possible with slow networks. Combinations of these access methods are also possible. For example, network client 12 may use a POTS or wireless dial-up connection to a modem bank maintained by an ISP (Internet Service Provider), which is in turn connected to network server 10 over a LAN. Network server 10 communicates with computers resident on Internet 18 through server/network communications link 16, which may comprise any suitable communications medium known in the art. Server/network communications link 16 is typically a much faster connection than client/server communications link 14.

Figure 2:
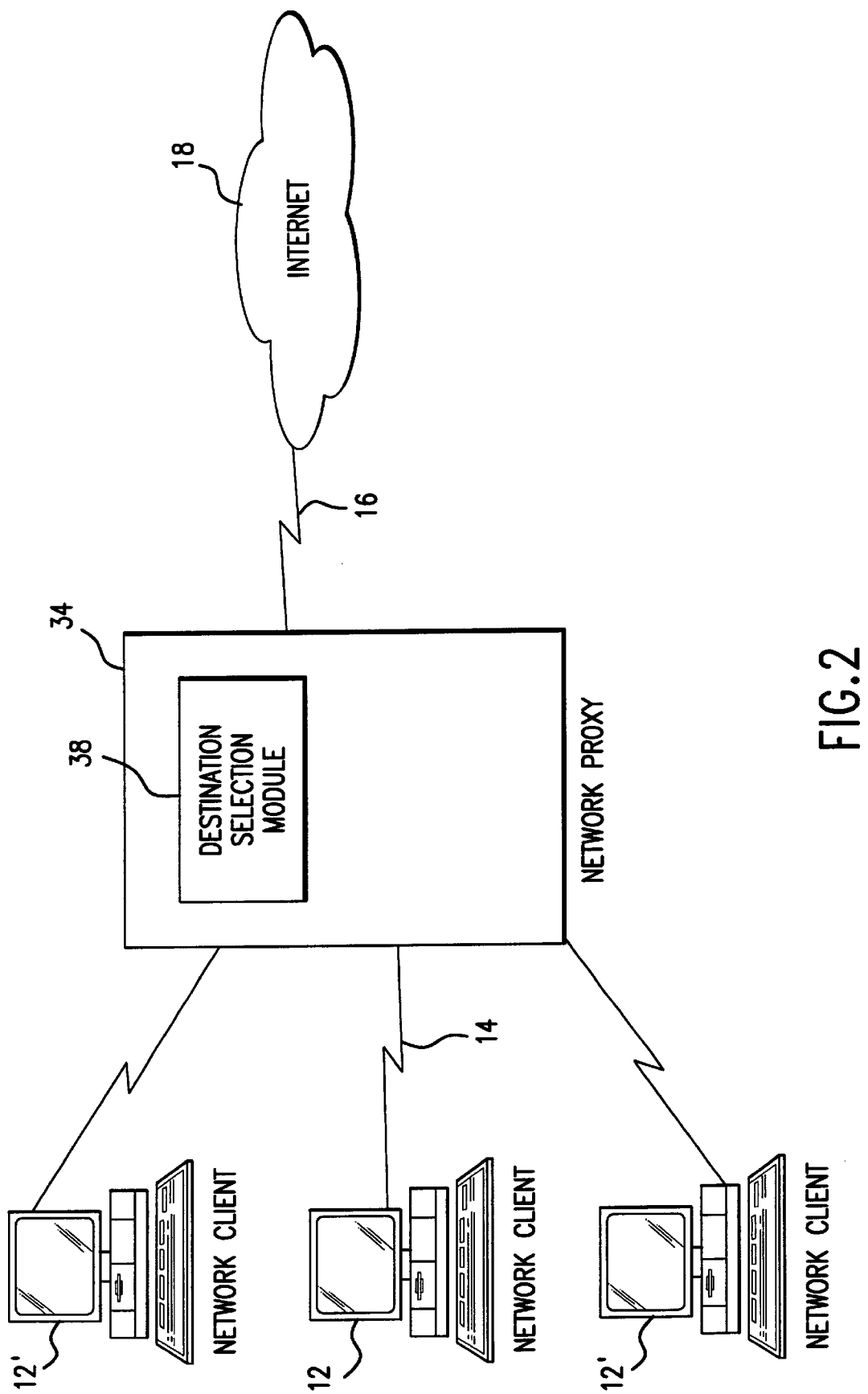
FIG. 2 is a schematic diagram illustrating a dynamically-chainable network proxy according to an embodiment of the present invention.

According to a first general embodiment of the present invention, illustrated schematically in FIG. 2, network client 12 accesses Internet 18 through a dynamically-chainable network proxy 34. Network proxy 34 may be implemented, for example, as part of a network server (such as network server 10 in FIG. 1), as a stand-alone computer in communication with a network server, or as a distributed system of computers. Network proxy 34 may be coupled, for example, to a network server (not shown), an ISP's network, a corporate network, or anywhere on Internet 18, and provides multiple users with a means to obtain content resident on Internet 18. Network proxy 34 may also be coupled to one or more additional network proxies (not shown).

Figure 3:
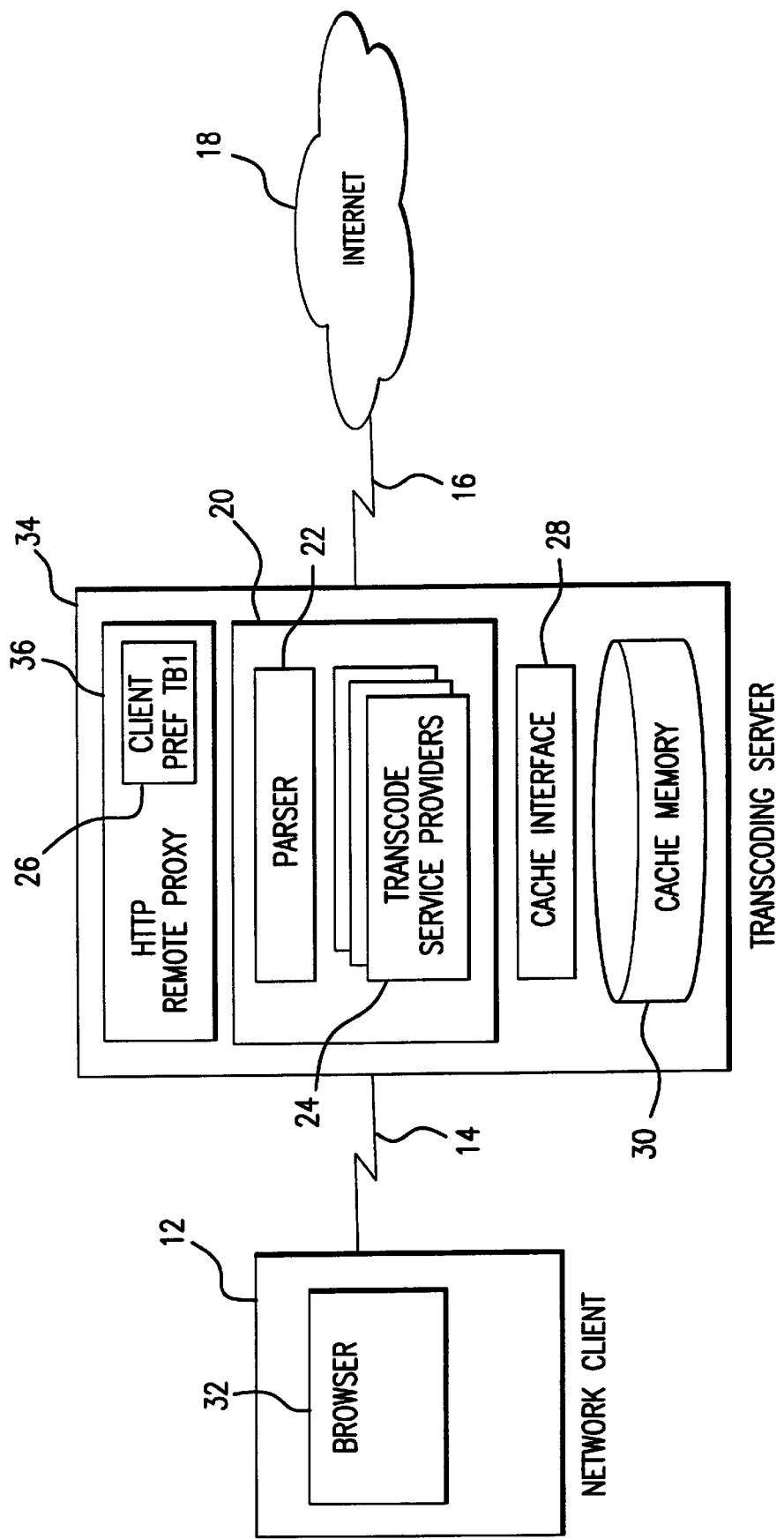
FIG. 3 is a schematic diagram illustrating a network proxy according to an embodiment of the present invention implemented as a transcoding server.

Network proxy 34 differs significantly from known network proxies, which generally are little more than a conduit for requests to, and replies from, external Internet resources. Here, network proxy 34 not only examines such requests and replies, but may act on commands in the requests by, for example, determining whether or not to direct the request to another network proxy. For example, network proxy 34 may be a so-called "smart proxy" of a type described in U.S. patent application Ser. No. 08/772,164 entitled "System for Enhancing Data Access Over a Communications Link," filed on Dec. 20, 1996 now U.S. Pat. No. 6,185,625, and U.S. patent application Ser. No. 08/799,654 entitled "Method and Apparatus for Scaling Image Data," filed on Feb. 11, 1997 still pending, both of which are assigned to Intel Corporation. FIG. 3 illustrates one embodiment of such a "smart proxy," implemented as a transcoding server.

Referring now to FIG. 3, a transcoder 20 includes a parser 22 and a plurality of transcode service providers 24. Parser 22 is configured to act upon data received by transcoder 20, such as a request for a network object generated by a client device or a reply to such a request provided by a content server device. In this particular embodiment, parser 22 is responsible for selectively invoking one or more of transcode service providers 24 based upon a predetermined selection criterion. In this particular embodiment, transcoding server 34 includes an HTTP (HyperText Transfer Protocol) remote proxy 36, capable of accessing Internet 18 over server/network conmunications link 16. Using transcoder 20, HTTP remote proxy 36 is capable of transcoding (for example, adding, changing and/or deleting) content received from Internet 18 prior to returning it to a requesting network client 12, as is described further in the above-referenced Intel patent applications.

HTTP remote proxy 36 includes a client preference table 26, which may be used to store information relating to the manner in which data should be transcoded before being sent to network client 12.

Looking more closely at the embodiment in FIG. 3, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language). As is explained further below, one or more transcode service providers 24 may be provided to act upon a command contained in a request or a data object received by transcoding server 34, or any other information determinable by transcoding server 34, to effect the dynamic configuration functionality described herein.

As shown in FIG. 3, transcoding server 34 may also include a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content.

Transcoding server 34 is coupled to network client 12 by client/server communications link 14. Network client 12 includes a browser 32, such as the Netscape Navigator v.3.0 browser (although the invention is not limited in this respect), which manages the presentation of data to a user. In this embodiment, network client 12 is "non-enabled," meaning no specialized transcoding software is preloaded on network client 12.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features, such as new or improved transcoding algorithms, while at the same time not requiring changing or retesting other software components in the system. This feature is especially beneficial where transcoding server 34 also interacts with "enabled" network clients equipped with specialized transcoding software, as described in the above-referenced Intel patent applications. Transcoding server 34 may advantageously be configured flexibly enough to readily interact with both non-enabled and enabled network clients.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this embodiment is through parser 22.

Server-side cache interface 28 may include the following calls:

CreateEntry(URL, &Entry, . . . );
  GetEntry(URL, &Entry);
  CreateStream(Entry, &StreamEntry, . . . );
  GetStream(Entry, &StreamEntry, . . . );
  CloseEntry(Entry);
  CloseStreamEntry(StreamEntry);
  GetProperties(Entry, &Properties, . . . );
  SetProperties(Entry, &Properties, . . . );
  Read(StreamEntry, &OutStream, . . . );
  Write(StreamEntry, &InStream, . . . ).

Unlike most cache memories, server-side cache interface 28 and server-side cache memory 30 enable maintenance of multiple representations of a given cached object, with descriptive information about each representation included in server-side cache memory 30. In addition, server-side cache interface 28 and server-side cache memory 30 serve as a synchronization point for multi-threaded accesses to cached objects. It should be noted that the illustrated embodiment does not require any particular configuration for server-side cache interface 28 and/or server-side cache memory 30. Indeed, functionality attributed to these components may be readily implemented in other system components.

The CreateEntry( ) call creates and returns a cache entry for a specified hypertext object. This call also creates an entry stream for an original version of the hypertext object. Similarly, the GetEntry( ) call obtains a cache entry for a hypertext object already existing in cache memory 30. Both the CreateEntry( ) and GetEntry( ) calls set locks on associated cached objects until a CloseEntry( ) call is invoked. Once a lock is set, the cached object will not be replaced or invalidated by cache interface 28, permitting one or more transcode service providers 24 to safely perform any required cache operations, such as object retrieval and/or storage.

After a cache entry is created or opened by a CreateEntry( ) or GetEntry( ) call, the CreateStream( ) or GetStream( ) calls may respectively create or open an extra stream entry for the cached object. Each extra stream entry is associated with a different transcoded version of the hypertext object, which may be retrieved or appended to by one of transcode service providers 24. Stream-based processing of cached objects makes it possible for transcoding server 34 to begin transmitting a transcoded version of a hypertext object to a requesting network client 12 even while transcode service provider 24 is appending additional transcoded content to that same version. Advantages of this stream-based processing include reducing user latency through incremental painting of objects and avoiding unnecessary idle time on client/server communications link 14, thereby providing users with a more responsive "feel."

The GetProperties( ) and SetProperties( ) calls retrieve and store information about cached objects, including information maintained by transcode service provider 24 used to determine transcoding properties and transcoding status of a cached object. Transcode service provider 24 may use such information, for example, to determine current compression progress for scaled data access and staged refinements.

The Read( ) call reads data from a specified cached object data stream. For example, transcode service provider 24 may invoke this call and tunnel stream data through HTTP remote proxy 36 directly to network client 12. The Write( ) call caches data from a new HTTP data stream. This call will append an incoming data stream received from, for example, a Web server or transcode service provider 24, to an opened cache stream which may be concurrently read using the Read( ) call.

In the present embodiment, parser 22 includes the following calls:

GetObject(URL, InParams, &OutParams, &OutStream, . . . );

GetScaledObject(URL, InParams, &OutParams, &OutStream, Stage, . . . );

PutObject(URL, InParamStruct, &InStream, &OutParams, &OutStream, . . . ).

As detailed below, parser 22 uses these calls to manage the provision of requested content to network client 12.

The GetObject( ) call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this embodiment, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Multiple-thread processing improves the efficiency of transcoding server 34 by not waiting for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from Internet 18 once, and appropriate versions may be transmitted to such multiple network clients 12 concurrently. It should be noted, however, that embodiments of the present invention may be implemented without multiple-thread processing.

Referring again to the embodiment illustrated in FIG. 2, network proxy 34 is capable of selectively routing a request received from network client 12 to any of a number of different destinations, including other network proxies 34'. To further illustrate the general operation of this embodiment, assume a user of network client 12 wishes to access a particular Web page, or URL (Uniform Resource Locator), on Internet 18. Network client 12, via its browser software, transmits an HTTP request for the HyperText object to network proxy 34 over client/server communications link 14. In this particular embodiment, network proxy 34 includes a destination selection module 38 configured to dynamically determine a destination address to which the request received from network client 12 will be forwarded. Destination selection module 38 may be implemented, for example, as a software routine within network proxy 34. With further reference to the embodiment of FIG. 3, destination selection module 38 may be implemented in any number of ways, including as a transcode service provider 24 under control of parser 22, as a module within parser 22, as a front-end to transcoder 20, or as a separate module coupled to HTTP remote proxy 36.

Destination selection module 38 may include decision logic for selecting a destination address based upon any of a wide variety of selection criteria. For example, destination selection module 38 may select an appropriate destination address based on information contained in a header portion of the request received from network client 12. Such information might include, for example, an address or other identifying information associated with network client 12. Another possible selection criterion might be an identifier for a particular service, such as a popular search engine, which the user of network client 12 wishes to access. Yet another possibility is that destination selection module 38 may choose to route the request to one of several network server computers capable of servicing the request based upon information relating to a present load status of such available servers or congestion on given links to those servers (that is, load on the network). In similar fashion, destination selection module 38 may choose to route the request to another network proxy based upon a load status of network proxy 34 itself. Likewise, destination selection module 38 can route the request through other transcoding servers based on, for example, the type of client making the request. Additionally, destination selection module 38 can route the request based on a determination that the requested content has been cached on another device. The information used by destination selection module 38 may be maintained in a data store, such as a look-up table, maintained or accessible by network proxy 34, or may be acquired or derived in real-time from other devices (e.g., potential target proxies or servers) to which network proxy 34 is coupled.

Figure 4:
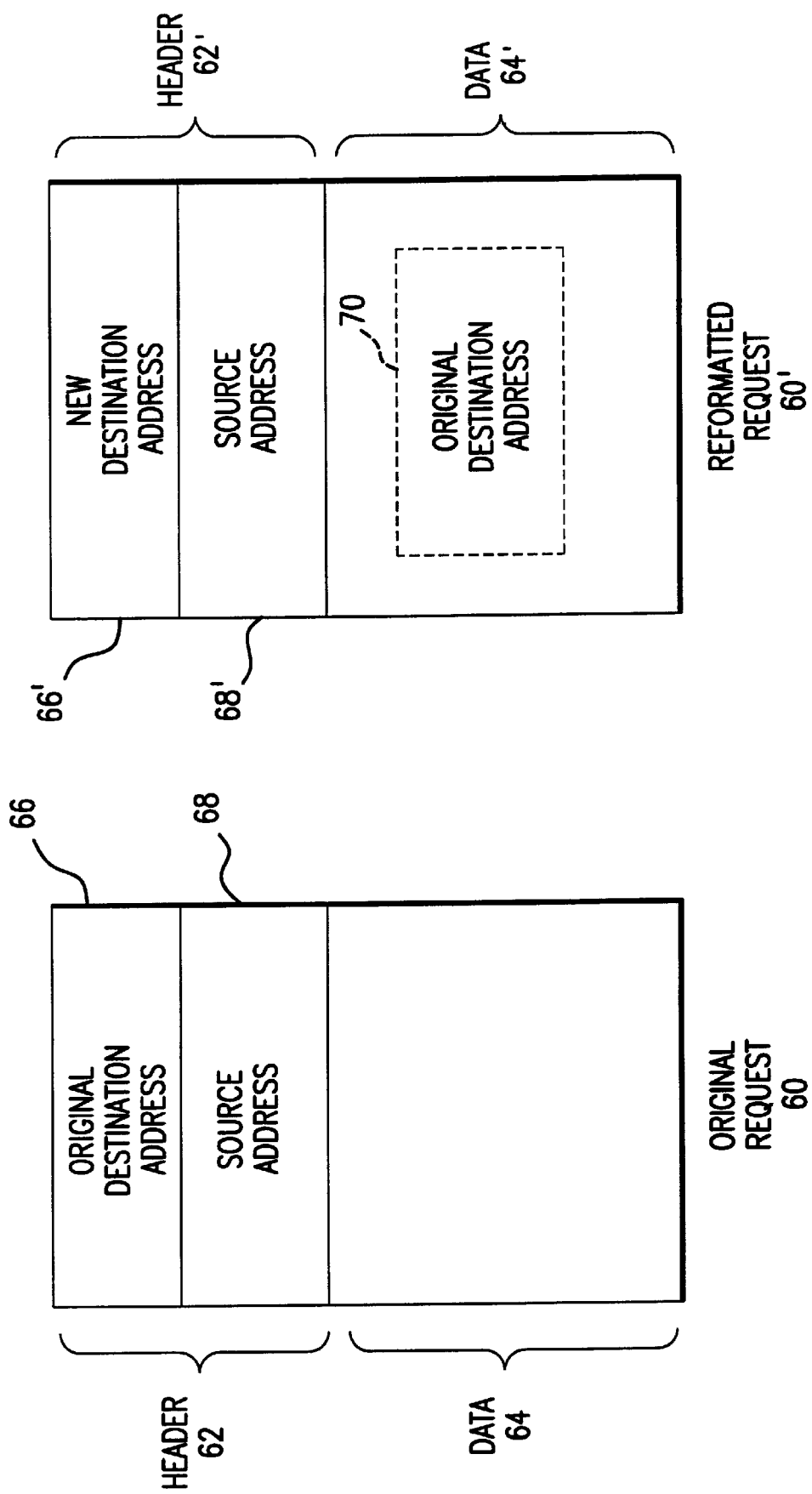
FIG. 4 is a schematic diagram illustrating a protocol for use by a dynamically-chainable network proxy according to an embodiment of the present invention.

To further describe the operation of a dynamically-chainable network proxy according to an embodiment of the present invention, FIG. 4 illustrates one possible implementation of a special communications protocol to achieve the dynamically-chainable functionality. As illustrated, an original request 60 of a type which might be received by network proxy 34 includes a header portion 62 and a data portion 64, with header portion 62 including a source address 68 and a destination address 66. In this example, source address 68 may correspond to a TCP/IP address associated with network client 12, while destination address 66 may correspond to a TCP/IP address for a network server device associated with a particular URL which the user of network client 12 wishes to retrieve.

Figure 5:
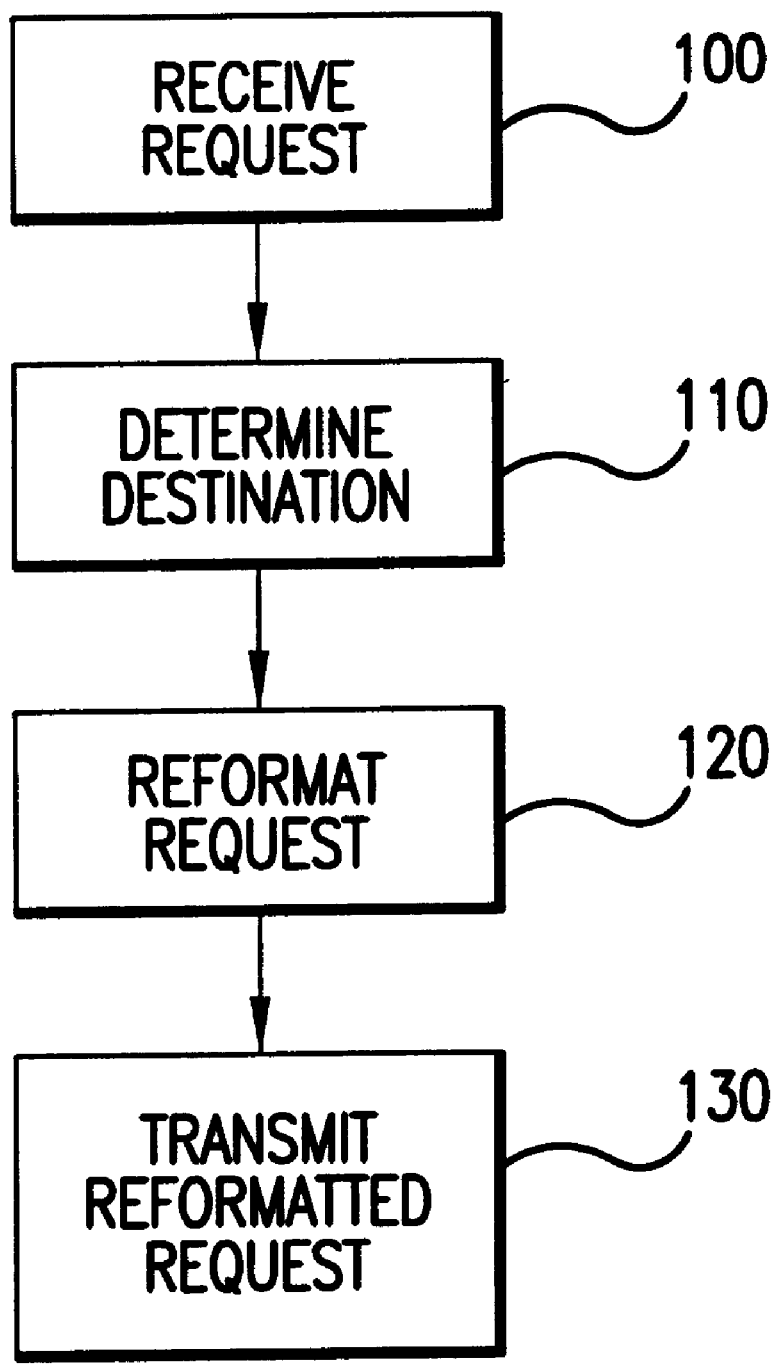
FIG. 5 is a flow chart illustrating a method for dynamically chaining a network proxy to a selected destination device according to an embodiment of the present invention.

With further reference to the flow chart of FIG. 5, upon receipt of a request, a data object or other message by network proxy 34 (Step 100), network proxy 34 determines a new destination address using, for example, destination selection module 38 as described above (Step 110). Network proxy 34 may then selectively generate a reformatted request 60' (Step 120) again including a header portion 62' and a data portion 64'. In reformatted request 60', however, the destination address 66' now designates a dynamically-selected destination. Network proxy 34 then forwards reformatted request 60' to the selected destination device (Step 130).

It is possible that network proxy 34 and a selected destination device, such as a particular network server on Internet 18 or another network proxy, may be configured to communicate using a protocol which avoids the need to reformat the message, or limits the extent to which such a message needs to be reformatted. In addition, messages transmitted between network proxy 34 and the selected destination device may optionally be encrypted and/or equipped with other authentication mechanisms (for example, a digital watermark) for security purposes in accordance with known technologies.

In the example illustrated in FIG. 4, the source address 68' of reformatted request 60' remains set to the address of network client 12. This will cause the destination device to treat reformatted request 60' as though it had originated with network client 12. Where the intended recipient for reformatted request 60' is another dynamically-chainable network proxy, or is otherwise configured to recognize a special protocol used by network proxy 34, network proxy 34 may alternatively reset source address 68' to its own address to ensure that the reply to reformatted request 60' is returned to network proxy 34. In such a case, network proxy 34 may embed the address for network client 12 elsewhere within the reformatted request using, for example, a "cookie" 70 or similar technique known in the art. This will then enable network proxy 34 to ascertain the ultimate originator of the request, which in this example is network client 12, thereby permitting network proxy 34 to forward the reply to the appropriate (requesting) device.

Reformatted request 60' may optionally include an indicator (not shown) identifying the fact that the request has been operated upon by network proxy 34. Once again, various techniques (e.g., cookies) are known for embedding such information within a request (or reply to a request), depending upon the particular communications protocol employed. Such an indicator may be useful in an embodiment where content being returned in response to a request by network client 12 may potentially pass through a plurality of different network proxies 34', each of which is capable of performing a different type of scaling, compression, or other type of transcoding on the requested content. In such a case, it may be ineffective or even counterproductive to transcode content that has already been transcoded by another network proxy. A network proxy which subsequently receives the data stream being returned may then use such an "already processed" indicator to determine whether or not to act upon the data stream before sending it on to its next, and possibly ultimate, destination.

As the foregoing description demonstrates, a network proxy configured according to an embodiment of the present invention may connect dynamically to zero or more successive proxies or other devices. The determination of such connections is not static, as with known network proxies, but rather may be based on, for example, a user command, a condition of the network environment, or some other predetermined selection criterion. A benefit provided by such an embodiment is that a system administrator, or even the network proxy itself, may dynamically change (or add or delete) the next device to which the network proxy is chained, thus providing substantially increased flexibility in system configuration. Moreover, once a network proxy is provided with the ability to dynamically chain to other proxies, a system administrator may reconfigure the network proxy without having to restart or reboot the device on which the network proxy is running. Embodiments of the present invention could thus be used to dynamically propagate reconfiguration instructions to a plurality of interconnected network devices. Similarly, the dynamic chaining capability described herein may be used in conjunction with suitably-written software to load balance a group of servers or links automatically, or to selectively pass a request from a user (or a class of users) to any of a plurality of different services automatically.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may be applied to communications protocols other than HTTP. Persons skilled in the art will recognize from the foregoing detailed description that many other alternatives, modifications and variations are possible.

What is claimed is:

1. A method for dynamically chaining a network proxy to a destination device, wherein the network proxy is coupled to a source device and a plurality of destination devices, said method comprising the steps of:

receiving a data request from the source device at a network proxy;

selecting one of the plurality of destination devices to service the data request, said selection being made by the network proxy according to a predetermined selection criterion;

selectively reformatting the data request for said selected destination device;

forwarding said selectively reformatted data request from said network proxy to said selected destination device;

receiving a response to said selectively reformatted data request at said network proxy, wherein said response comprises data requested by the source device; and forwarding said response to said source device.

2. The method of claim 1, wherein said forwarding step further comprises forwarding said selectively reformatted data request to a second network proxy.

3. The method of claim 2, wherein said forwarding step further comprises forwarding said selectively reformatted data request to a second network proxy that is dynamically chainable.

4. The method of claim 1, wherein said reformatting step further comprises selectively reformatting said data request as an HTTP-compliant data request.

5. The method of claim 1, wherein said receiving a response to said selectively reformatted data request comprises receiving said response from said selected destination device.

6. The method of claim 1, wherein said receiving a response to said selectively reformatted data request comprises receiving said response from a device other than said selected destination device.

7. A network proxy coupled between a source device and a plurality of destination devices, said network proxy comprising a destination selection module for dynamically chaining said network proxy to a selected one of said plurality of destination devices, said destination selection module comprising a set of executable instructions for receiving a data request from the source device, selecting one of the plurality of destination devices to receive said data request based on a predetermined selection criterion, reformatting said data request for transmission to said selected destination device, receiving a response to said data request, said response comprising data requested by the source device, and forwarding said response to the source device.

8. The network proxy of claim 7, wherein said predetermined selection criterion comprises a characteristic of said data request.

9. The network proxy of claim 7, wherein said predetermined selection criterion comprises a command embedded within said data request.

10. The network proxy of claim 7, wherein said predetermined selection criterion comprises a characteristic of said network proxy.

11. The network proxy of claim 7, wherein said predetermined selection criterion comprises a characteristic of said plurality of destination devices.

12. The network proxy of claim 7, wherein said network proxy is coupled to said plurality of destination devices by a respective plurality of communications links, said predetermined selection criterion comprising a characteristic of said plurality of communications links.

13. A set of instructions residing on a storage medium for execution by a network proxy, wherein the network proxy is coupled to a source device and a plurality of destination devices, said set of instructions comprising instructions for:

receiving at the network proxy a data request from the source device;

selecting one of the plurality of destination devices to service the data request, said selection being made by the network proxy according to a predetermined selection criterion;

reformatting the data request for said selected destination device;

forwarding said reformatted data request from the network proxy to said selected destination device;

receiving at the network proxy a response to said selectively reformatted data request, said response comprising data requested by the source device; and forwarding said response to said source device.

* * * * *